(12) United States Patent
Jones et al.

(10) Patent No.: US 10,103,390 B2
(45) Date of Patent: Oct. 16, 2018

(54) METHOD FOR PRODUCING KISS CUT FLUID FLOW FIELD PLATES

(71) Applicant: ENERGYOR TECHNOLOGIES INC, Saint-Laurent (CA)

(72) Inventors: Thomas David Jones, Montreal (CA); Michel Meyer Bitton, Saint-Laurent (CA)

(*) Notice: Subject to any disclaimer, the term of this patent is extended or adjusted under 35 U.S.C. 154(b) by 476 days.

(21) Appl. No.: 14/690,854

(22) Filed: Apr. 20, 2015

(65) Prior Publication Data

US 2016/0308223 A1 Oct. 20, 2016

(51) Int. Cl.
| | |
|---|---|
| *H01M 8/02* | (2016.01) |
| *H01M 8/0258* | (2016.01) |
| *H01M 8/04007* | (2016.01) |
| *H01M 8/0263* | (2016.01) |
| *H01M 8/026* | (2016.01) |
| *B26D 3/06* | (2006.01) |
| *H01M 8/0265* | (2016.01) |
| *B32B 37/16* | (2006.01) |

(52) U.S. Cl.
CPC ..... *H01M 8/0258* (2013.01); *H01M 8/04007* (2013.01); *B26D 3/065* (2013.01); *B32B 37/16* (2013.01); *H01M 8/026* (2013.01); *H01M 8/0263* (2013.01); *H01M 8/0265* (2013.01); *Y10T 156/1064* (2015.01); *Y10T 156/1082* (2015.01)

(58) Field of Classification Search
CPC .................................................... B26D 3/065
See application file for complete search history.

(56) References Cited

U.S. PATENT DOCUMENTS

| | | | |
|---|---|---|---|
| 5,300,370 A | 4/1994 | Washington et al. | |
| 5,521,018 A | 5/1996 | Wilkinson et al. | |
| 5,683,828 A | 11/1997 | Spear et al. | |
| 2011/0281192 A1* | 11/2011 | Jones | H01M 8/0213 429/457 |
| 2013/0089802 A1* | 4/2013 | Artibise | H01M 8/0258 429/457 |

* cited by examiner

*Primary Examiner* — Linda L Gray
(74) *Attorney, Agent, or Firm* — Philip A. Swain; IPSIS, Inc.

(57) ABSTRACT

Disclosed herein is a method for producing fluid flow field plates with complex flow field geometries. The method includes locating an electrically conductive sheet on top of another electrically conductive sheet so that they are in intimate contact with each other. The sheets are sealed together, with a manifold opening cut through the sheets. A channel for a fluid is created by kiss cutting through the first sheet so that the channel is in fluid communication with the manifold opening.

22 Claims, 6 Drawing Sheets

METHOD FOR PRODUCING KISS CUT FLUID FLOW FIELD PLATES

TECHNICAL FIELD

The present generally concerns electrochemical fuel cells and more particularly to a method for producing fluid flow field plates with complex flow field geometries.

BACKGROUND

Polymer electrolyte membrane or proton exchange membrane (PEM) fuel cell systems have intrinsic benefits and a wide range of applications due to their relatively low operating temperatures and good balance of specific power (Watts/kg), power density (Watts/liter), specific energy (Watt-hours/kg) and energy density (Watt-hours/liter). The active portion of a PEM cell is a membrane sandwiched between an anode and a cathode layer. Fuel containing hydrogen is passed over the anode and oxygen (air) is passed over the cathode. The reactants, through the electrolyte membrane, react indirectly with each other generating an electrical voltage between the cathode and anode. Typical electrical potentials of PEM cells can range from 0.5 to 0.9 volts where the higher the cell voltage, the greater the electrochemical efficiency. At lower cell voltages, the current density is higher but there is eventually a peak value in power density for a given set of operating conditions. The electrochemical reaction also generates heat and water as byproducts that must be extracted from the fuel cell, although the extracted heat can be used in a cogeneration mode, and the product water can be used for humidification of the membrane, cell cooling or dispersed to the environment.

Multiple cells are combined by stacking, interconnecting individual cells in an electrical series configuration. The voltage generated by the fuel cell stack is effectively the sum of the individual cell voltages. There are designs that use multiple cells in parallel or in a combination series-parallel connection. Fluid flow field plates are inserted between the cells to separate the anode reactant of one cell from the cathode reactant of the next cell. These plates are typically graphite based or metallic in nature. To provide hydrogen to the anode and oxygen to the cathode without mixing, a system of fluid distribution and seals is required.

The dominant design at present in the fuel cell industry is to use fluid flow field plates with the flow fields machined, molded or otherwise impressed. An optimized flow field plate has to fulfill a series of requirements: very good electrical and heat conductivity; gas tightness; corrosion resistance; low weight; and low cost. The fluid flow field plate design ensures good fluid distribution as well as the removal of product water and heat generated. Manifold design is also critical to uniformly distribute fluids between each separator/flow field plate.

There is an ongoing effort to innovate in order to increase the specific power and power density (reduce weight and volume) of fuel cell stacks, and to reduce material and assembly costs.

In a fuel cell system (stack & balance of plant), the stack is the dominant component of the fuel cell system's weight and cost and the fluid flow field plates are the major component (both weight and volume) of the stack.

Fluid flow field plates are a significant factor in determining the specific power and power density of a fuel cell, typically accounting for 40 to 70% of the weight of a stack and almost all of the volume. For component developers, the challenge is therefore to reduce the weight, size and cost of the fluid flow field plate while maintaining the desired properties for high-performance operation.

The material for the fluid flow field plate must be selected carefully due to the challenging environment in which it operates. In general, it must possess a particular set of properties and combine the following characteristics:
- High electrical conductivity, especially in through-plane direction
- Low contact resistance with the gas diffusion layer (GDL)
- High thermal conductivity, both in-plane and through-plane
- Good thermal stability, limiting expansion and contraction due to temperature variations
- Good mechanical strength and resistance to cracking
- Able to maintain good feature tolerance for flow fields, etc.
- Fluid impermeability to prevent reactant and coolant leakage, especially for the case of gaseous hydrogen
- Corrosion resistance
- Resistance to ion-leaching, so as not to contaminate the membrane electrode assembly (MEA)
- Thin and lightweight
- Low cost and ease of manufacturing
- Recyclable
- Environmentally benign A number of different methods have been used to manufacture fluid flow field plates including for example, U.S. Pat. No. 5,300,370 to Washington et al for "Laminated Fluid Flow Field Assembly for Electrochemical Fuel Cells" on Apr. 5, 1994. This patent describes a laminated fluid flow field assembly comprising a separator layer and a stencil layer, where in operation, the separator layer and stencil layer cooperate to form an open faced channel for conducting pressurized fluids. Although this patent is namely for discontinuous flow field configurations, it also addresses continuous flow field designs. This method, however, has a number of significant drawbacks which focus mainly on the fabrication of the stencil layer. When the flow channels in the stencil layer are formed, material is removed from the flow field plate, and therefore the remaining channel landings are left unsupported. Effectively, the landings of the stencil layer plate would move indiscriminately, therefore leaving the stencil layer to be very difficult to handle and position. Further, the tolerance required for the correct flow channel width to ensure accurate fluid flow distribution per channel would not be maintained, especially for the continuous flow field design.

Another example is provided in U.S. Pat. No. 5,521,018 to Wilkinson et al for "Embossed Fluid Flow Field Plate for Electrochemical Fuel Cells" on May 28, 1996. This patent namely describes an embossed fluid flow field plate comprising two sheets of compressible, electrically conductive material, where each sheet has two oppositely facing major surfaces, where at least one of the major surfaces has an embossed surface which has a fluid inlet and at least one open-faced channel embossed therein. A metal sheet is interposed between each of the compressible sheets. Although this patent focuses mainly on embossed fluid flow field plates, it provides an example of a coolant flow field plate where a single coolant flow channel is die-cut and the sealant channel is embossed. It is indeed an advantage to have a single channel joining the fluid inlet and fluid outlet when removing material to form the flow channel, as in this case, since the perimeter of the channel is effectively supported. With that said, the channel is of a complex, serpentine geometry and even though it is supported around the perimeter, the landings are not supported within the plate, therefore making it impractical to handle and position after it is fabricated.

U.S. Pat. No. 5,683,828 to Spear et al for "Metal Platelet Fuel Cells Production and Operation Methods" on Nov. 4, 1997 describes fuel cell stacks comprising stacked separator/membrane electrode assembly cells in which the separators comprise a series of stacked thin sheet platelets having individually configured serpentine micro-channel reactant gas humidification, active area and cooling fields within. Although this patent outlines a method to fabricate a metal platelet comprising a complex serpentine flow geometry which is supported throughout by a means to maintain the correct flow channel spacing, thereby allowing the platelet to be easily handled after fabrication without the flow channel landings shifting, the method described for manufacturing these flow channel supports is depth etching, which is a relatively costly manufacturing method and does not lend itself to higher volume production.

Thus, there is a need for an improved method for fabricating fluid flow field plates with complex fluid flow field geometries.

BRIEF SUMMARY

We have designed a low cost method for producing lightweight fluid flow field plates with complex flow field geometries. The fluid flow field plates produced using our method have kiss cut fluid flow field channels, cut through fluid manifolds, and embossed perimeter and manifold mechanical bonding features. The method involves placing at least two sheets of flexible graphite, one on top of the other, and kiss cutting through the top layer to form fluid flow field channels while simultaneously embossing mechanical bonding features. The unwanted material is then removed, similar to peeling a sticker, and the bottom flexible graphite sheet holds the remaining channel landings in place. The part is then finished. Unlike the examples described above, our method produces a practical fluid flow field plate with complex flow field geometries that is easily handled. It requires only die cutting flow channels and manifolds while simultaneously embossing mechanical bonding features and then finishing the part by pressing. Our method cuts all flow channels and manifolds in one step, and the "finishing" step does not require careful part alignment. Furthermore, our method only requires one die per part.

Accordingly, there is provided a method for producing fluid flow field plates with complex flow field geometries, the method comprising:

locating a first electrically conductive sheet on top of a second electrically conductive sheet so that they are in intimate contact with each other, the first and second electrically conductive sheets being sealed together, with at least one manifold opening cut through the first and second electrically conductive sheets; and creating at least one channel for a fluid by kiss cutting through the first electrically conductive sheet so that the at least one channel is in fluid communication with the at least one manifold opening.

In one example, the method further comprises: embossing the first and second electrically conductive sheets to create therein at least one mechanical bonding feature therebetween, the kiss cutting, cutting through and embossing steps being carried out simultaneously.

In one example, the step of kiss cutting involves completely cutting through the first electrically conductive sheet and partially cutting into the second electrically conductive sheet.

In one example, the first and second electrically conductive sheets are sealed around a peripheral area.

In another example, the method further comprises: finishing the cut and embossed first and second electrically conductive sheets by pressing them between two rigid, flat plates. The rigid, flat plates each include a non-stick coating.

In another example, the method further comprises: finishing the cut and embossed first and second electrically conductive sheets by pressing them between two parallel rollers. The parallel rollers each include a non-stick coating.

In one example, the first and second electrically conductive sheet are sealed together using an adhesive.

In another example, the kiss cutting step is carried out using a die having at least one blade.

In another example, the embossing step is carried out using a die having at least one embossing feature.

In yet another example, the cut and embossed plate includes: i) one or more oxidant flow openings; and ii) one or more oxidant inlet manifold openings and one or more oxidant outlet manifold openings are located at the ends of the oxidant flow openings and in communication therewith.

In yet another example, the cut and embossed plate includes: i) one or more fuel flow openings; and ii) one or more fuel inlet manifold openings and one or more fuel outlet manifold openings which are located at the ends of the fuel flow openings.

In one example, the cut and embossed plate includes: i) one or more coolant flow openings; and ii) at least one coolant inlet manifold opening and at least one coolant outlet manifold opening are located at the ends of the coolant flow openings and in communication therewith.

In one example, the cut and embossed plate is an oxidant flow field plate, a fuel flow field plate, or a coolant flow field plate.

In one example, the plate includes two manifold openings fluidly connected to three channels, the three channels being disposed substantially parallel to each other and disposed in a serpentine configuration.

In another example, the cut and embossed plate is a separator plate.

In yet another example, the separator plate is a cooling fin separator plate.

In yet another example, the first and second electrically conductive sheets are flexible graphite.

According to another aspect, there is provided a method for producing fluid flow field plates with complex flow field geometries, the method comprising:

locating a first electrically conductive sheet onto a second electrically conductive sheet so that they are in intimate contact with each other;

kiss cutting through the first electrically conductive sheet to create therein at least one channel for a fluid;

cutting through the first and second electrically conductive sheets to create therein at least one manifold opening for a fluid; and embossing the first and second electrically conductive sheets to create therein at least one mechanical bonding feature therebetween, the kiss cutting, cutting through and embossing steps being carried out simultaneously.

In one example, a plurality of electrically conductive sheets are stacked one on top of the other.

In another example, one or more of the electrically conductive sheets is a separator plate.

BRIEF DESCRIPTION OF THE DRAWINGS

These and other features of that described herein will become more apparent from the following description in which reference is made to the appended drawings wherein.

DETAILED DESCRIPTION

Definitions

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

As used herein, the term "flow field plate" is intended to mean a plate that is made from a suitable electrically conductive material. The material is typically substantially fluid impermeable, that is, it is impermeable to the reactants and coolants typically found in fuel cell applications, and to fluidly isolate the fuel, oxidant, and coolants from each other. In the examples described below, an oxidant flow field plate is one that carries oxidant, whereas a fuel flow field plate is one that carries fuel, and a coolant flow field plate is one that carries coolant. The flow field plates can be made of the following materials: graphitic carbon impregnated with a resin or subject to pyrolytic impregnation; flexible graphite; metallic material such as stainless steel, aluminum, nickel alloy, or titanium alloy; carbon-carbon composites; carbon-polymer composites; or the like. Flexible graphite, also known as expanded graphite, is one example of a suitable material that is compressible and, for the purposes of this discovery, easily cut through and embossed.

As used herein, the term "fluid" is intended to mean liquid or gas. In particular, the term fluid refers to the reactants and coolants typically used in fuel cell applications.

1. Fluid Flow Field Plate Description

Figure 1:
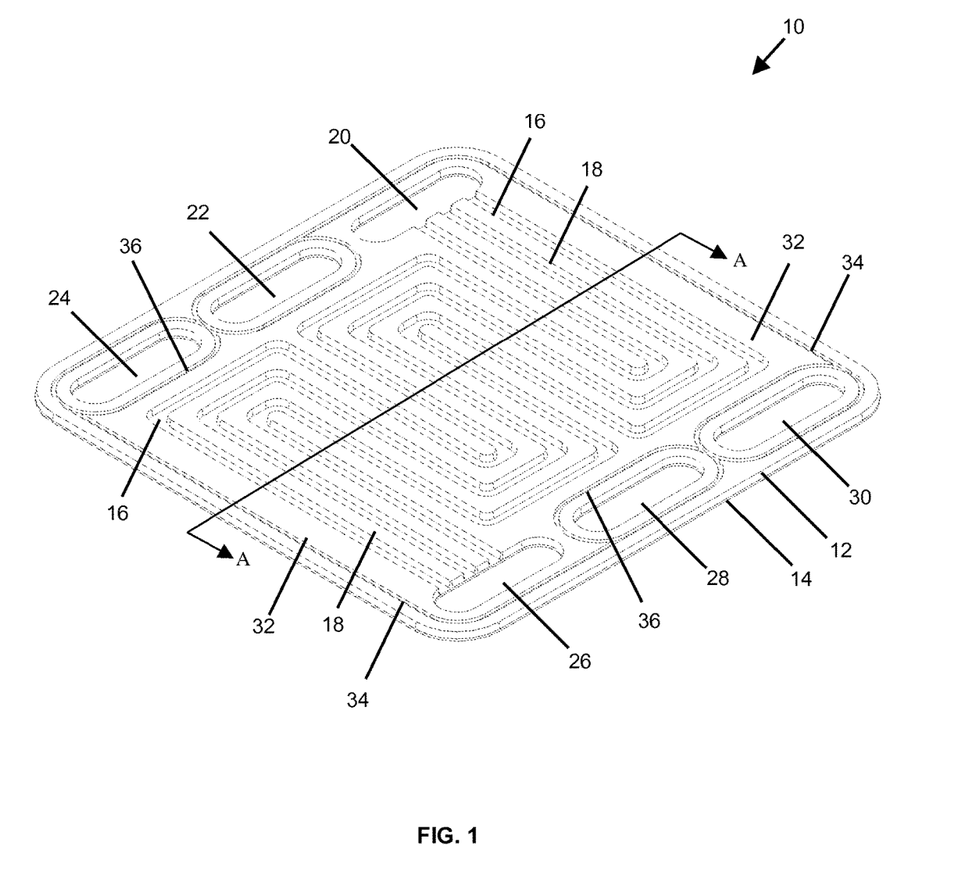
FIG. 1 is a perspective top view of a fluid flow field plate showing a three-pass serpentine geometry comprising kiss cut fluid flow field channels, cut through fluid manifolds, and embossed perimeter and manifold mechanical bonding features.
Figure 2A:
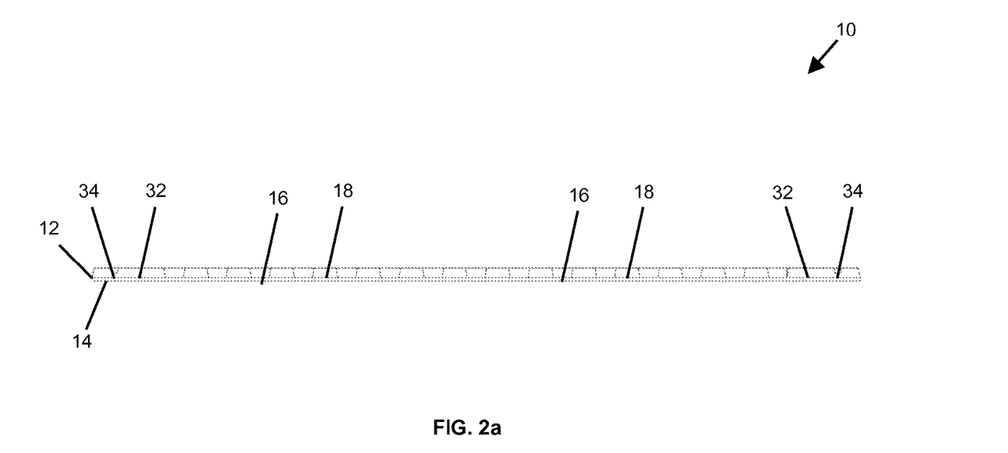
FIG. 2a is a cross-sectional view of FIG. 1 taken along line A-A showing kiss cut fluid flow channels and embossed perimeter mechanical bonding feature.
Figure 3:
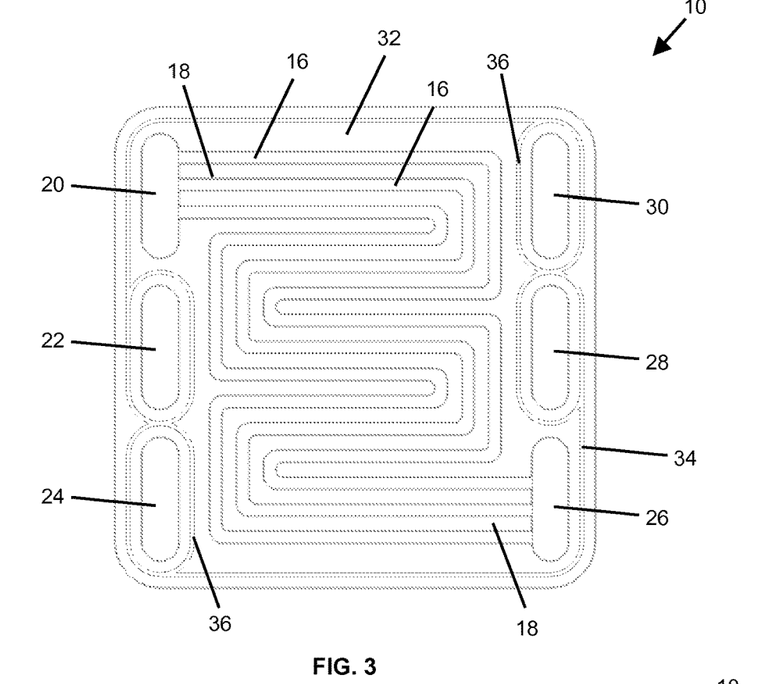
FIG. 3 is a top view of the flow field plate of FIG. 1 showing the kiss cut serpentine flow field pattern as well as embossed perimeter and manifold mechanical bonding features.

Referring now to FIGS. 1, 2a and 3, a fluid flow field plate with a three-pass serpentine geometry is shown generally at 10. Broadly speaking, the fluid flow field plate 10 comprises an first upper flow field plate 12 and a second lower separator plate 14 which are located in intimate contact with each other. A first plurality of kiss cut fluid flow channels 16 are located within the upper flow field plate 12 and adjacent to a plurality of channel landings 18. A fluid inlet manifold opening 20 and a fluid outlet manifold opening 26 are cut through a peripheral area 32 and are spaced apart from each other. The fluid flow channels 16 connect the fluid inlet manifold opening 20 and the fluid outlet manifold opening 26 and are in fluid communication therewith. The fluid flow channels 16 are disposed substantially parallel to each other and cover substantially the entire area for the first upper flow field plate 12. In the example illustrated, three spaced apart and substantially parallel fluid flow channels 16 are disposed in a serpentine configuration. However, a person skilled in the art will readily recognize that one or more fluid flow channels 16 can be kiss cut into the first upper flow field plate 12. The number of fluid flow channels 16 will depend on the intended application. Additional fluid manifold openings 22, 24, 28 and 30 are also cut through the peripheral area 32 and permit other fluids, typically used in fuel cells, to flow through, to and from adjacent fluid flow field plates (not shown) in a stacked fuel cell. A perimeter mechanical bonding feature 34 is embossed into the peripheral area 32 which fuses together the upper flow field plate 12 and the lower separator plate 14, thereby creating a seal between the plates 12, 14. Similarly, a manifold mechanical bonding feature 36 is embossed into the peripheral area 32. This creates another seal around the fluid manifold openings 22, 24, 28 and 30. The embossed mechanical bonding features 34 and 36 also act as a seat for a separate seal (not shown). The first upper flow field plate 12 and the second lower separator plate 14 can be sealed together using a sealing material such as for example, a polymeric sealing compound or adhesive. The sealing material can be applied to one or both of the first upper flow field plate 12 and the second lower separator plate 14 on the peripheral area 32 and around each of the fluid manifold openings 22, 24, 28 and 30.

Figure 2B:
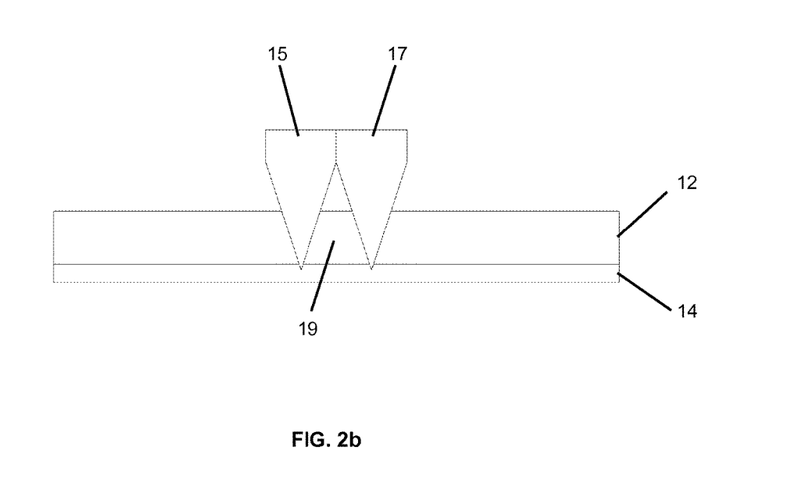
FIG. 2b is a cross-sectional view of a die kiss cutting completely through the first electrically conductive sheet and partially into the second electrically conductive sheet.

As best illustrated in FIG. 2b, a die having two blades 15, 17 cuts through the first upper flow field plate 12 and cuts partially into the second lower separator plate 14. The blades 15, 17 when they travel through the first upper flow field plate 12 force a small portion of material to mechanically bond with the second lower separator plate 14 along the die blade tip as it partially cuts into it. The angled faces of the two blades 15, 17 cut a trapezoidal shaped piece of scrap 19, when viewed in cross section, from the intimately located first upper flow field plate 12 and the second lower separator plate 14. The trapezoidal shaped piece of scrap 19 is then later removed in a manner similar to peeling a sticker. The kiss cut fluid flow channels 16, when viewed in cross section, assume the trapezoidal shape. However, it should be noted that the cross sectional shape of the channels 16 can be any shape desired by the user and is dictated by the cross sectional shape of the die.

Figure 4:
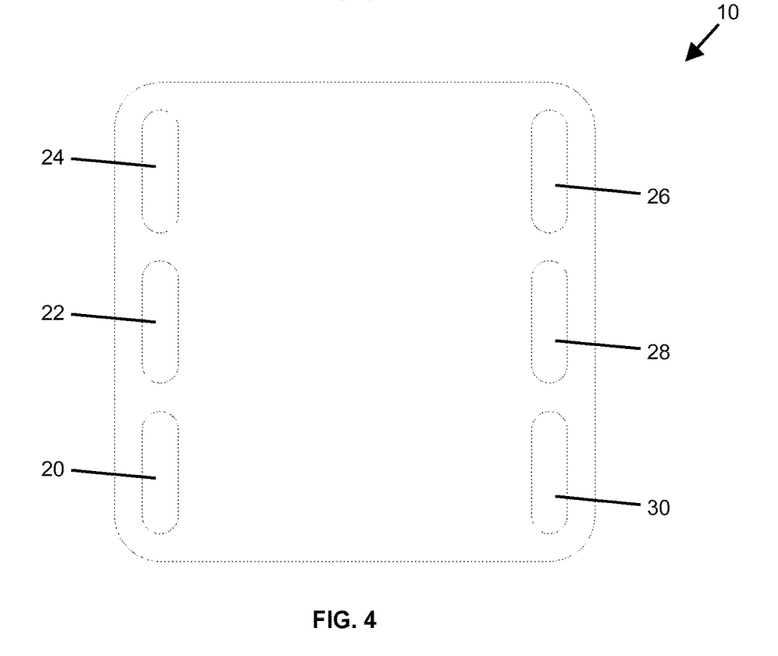
FIG. 4 is a bottom view of the flow field plate of FIG. 1 showing cut through fluid manifolds.

As best illustrated in FIGS. 3 and 4, the first upper flow field plate 12 includes the fluid channels 16 and the fluid manifold openings 20, 22, 24, 26, 28 and 30, whereas the second lower separator plate 14 includes only the fluid manifold openings 20, 22, 24, 26, 28 and 30.

Figure 5:
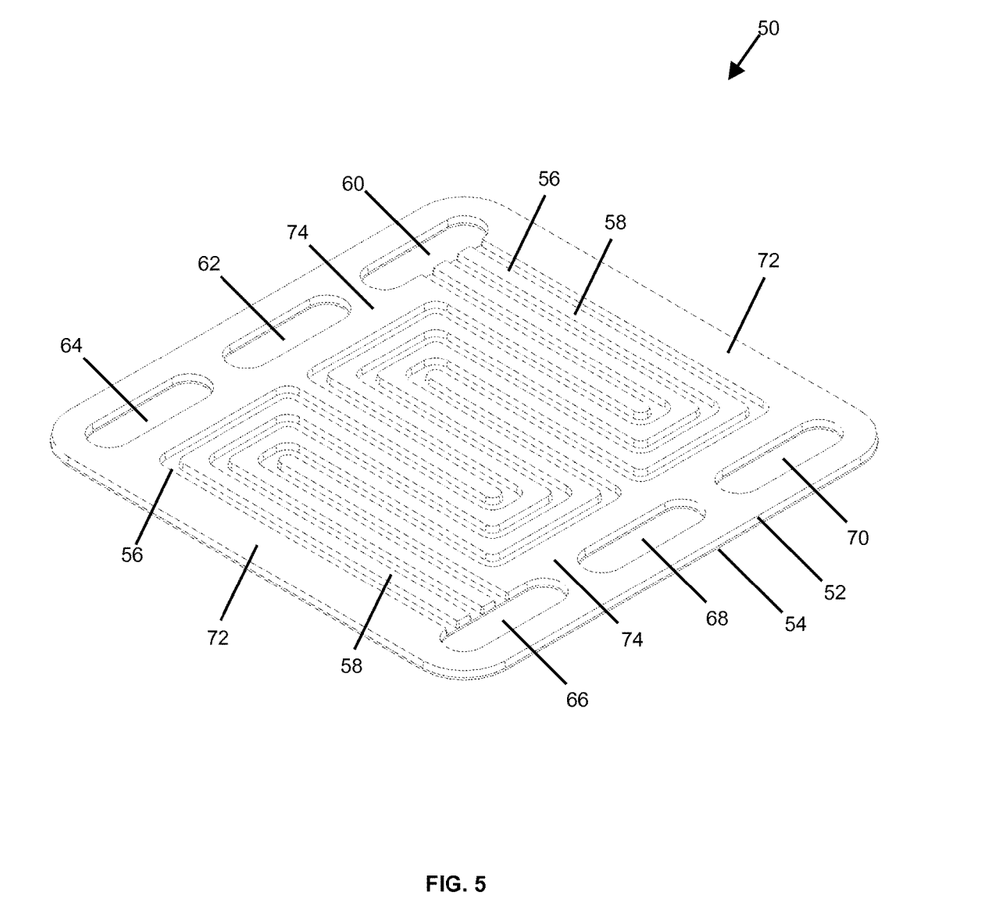
FIG. 5 is a perspective top view of another alternative example of a flow field plate showing a three-pass serpentine geometry comprising kiss cut fluid flow field channels, cut through fluid manifolds, and adhesively bonded perimeter and manifold areas.

Referring now to FIG. 5, an alternative example of a fluid flow field plate with a three-pass serpentine geometry is shown generally at 50. This example is essentially the same as the one described above and includes a first upper fluid flow field plate 52, a second lower separator plate 54, a plurality of serpentine fluid flow channels 56 adjacent to a plurality of channel landings 58. Also included are fluid manifold openings 60, 62, 64, 66, 68 and 70. The difference between the fluid flow field plate 50 and the fluid flow field plate 10 is a lack of embossing features. A first peripheral area 72 and a second peripheral area 74 near the fluid manifold openings 60, 62, 64, 66, 68 and 70 are sealed to the corresponding second lower separator plate 54 by way of an adhesive sealant.

Figure 6:
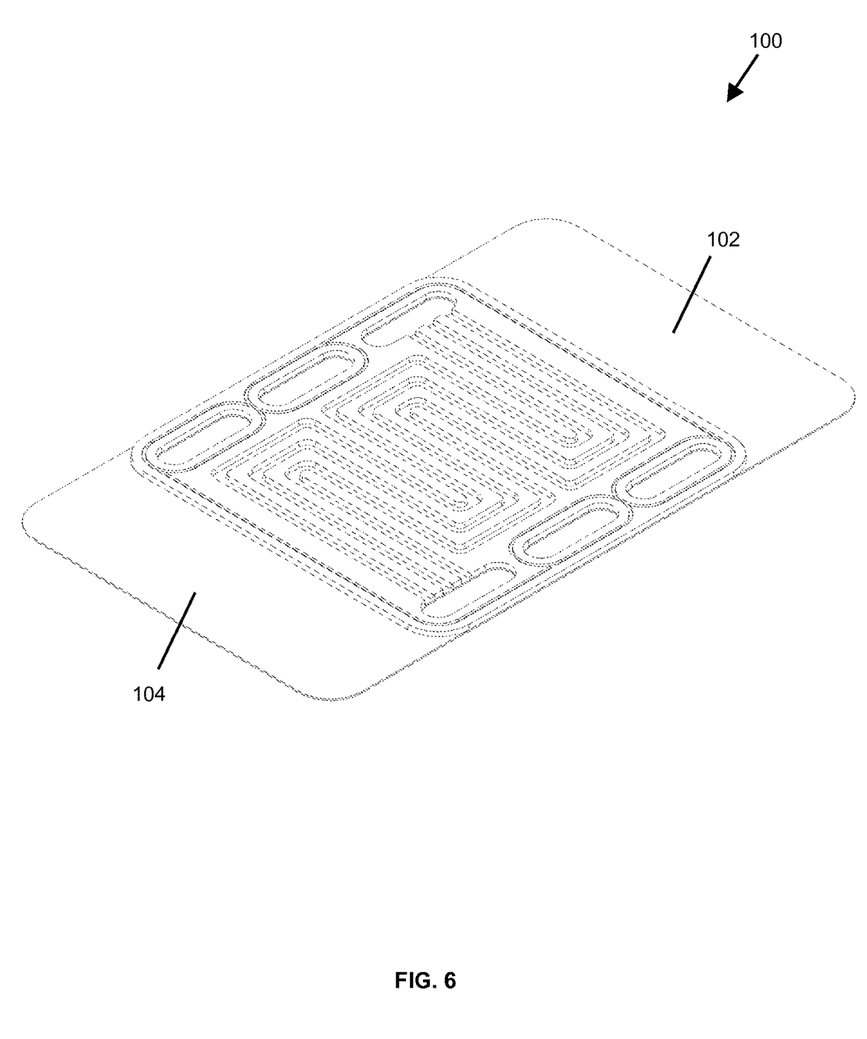
FIG. 6 is a perspective top view of a fluid flow field plate with two cooling fins extending away from the plate.

Referring now to FIG. 6, another alternative example of a fluid flow field plate is shown generally at 100. In this example, the structural features are identical to that of either the fluid flow field plate 10 or the fluid flow field plate 50 described above. The main difference, however, is the location of two cooling fins 102, 104 which extend in a co-planar fashion from the fluid flow field plate 100. In the example illustrated, the cooling fins can either extend away from the upper fluid flow field plate or the second lower separator plate. When the fluid flow field plates are stacked together to form a stacked repeating unit cell, the cooling fins 102,104 help to maintain a constant temperature within the stack by laterally transferring heat to the external cooling fins 102, 104. The cooling fins 102, 104 also act as a separator between each repeating unit cell. Typically, when multiple cells are assembled, each fuel flow field plate lies in intimate contact with a cooling fin separator plate, thereby sealing the fluid channels.

Figure 7:
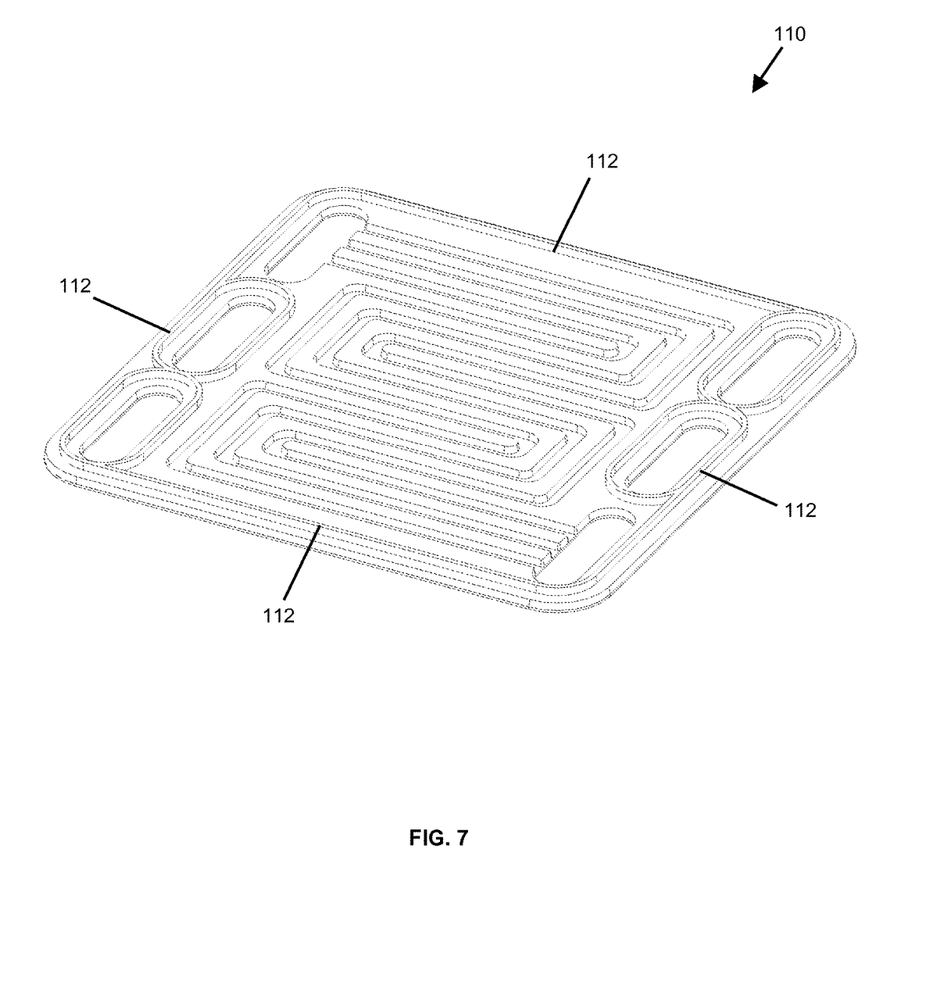
FIG. 7 is a perspective top view of a silicone seal sitting in the embossed seat and protruding above the surface of the plate.

Referring now to FIG. 7, in which another alternative example of a fluid flow field plate is shown generally at 110. In this example, a silicone seal 112 sits in an embossed seat and protrudes above the planer surface of the plate 110. The silicone seal provides sealing against an adjacent MEA or other components typically found in a fuel cell stack. The silicone seal 112 is applied using injection molding or using a silicone dispenser, for example, a robotically controlled silicone dispenser. The embossed features described above permit the location of the silicone seal 112 so as to sealingly join the first upper fluid flow field plate and the lower separator plate together.

The fuel cell stacks described herein are particularly well suited for use in fuel cell systems for unmanned aerial vehicle (UAV) applications, which require very lightweight fuel cell systems with high specific energy and energy density. Other uses for the lightweight fuel cell stacks include auxiliary power units (APUs) and small mobile applications such as scooters. Indeed, the fuel cell stacks may be useful in many other fuel cell applications such as automotive, stationary and portable power.

2. Manufacturing Process

The fluid flow field plates with complex flow field geometries are manufactured using electrically conductive flexible graphite sheets, which are used to produce the first upper flow field plate 12 and the lower separator plate 14. The flexible graphite sheets can be purchased in roll form.

Flexible dies used in the cutting and embossing part of the manufacturing process are available from many die manufacturers, are typically used for label cutting and embossing applications and generally can fabricate hundreds of thousands of plates. The flexible die design is dependent on feature geometry and material thickness.

Typically, for an oxidant flow field plate, a 0.020" thick sheet is used.

Typically, for a fuel flow field plate, a 0.015" thick sheet is used.

Typically, for a coolant flow field plate, a 0.020" thick sheet is used.

Typically, for a separator plate, a 0.010" thick sheet is used.

Broadly speaking, the method includes locating the first upper flow field plate 12 (the first electrically conductive sheet 12) on the top of the second lower separator plate 14 (the second electrically conductive sheet 14) so that they are in intimate contact with each other. The first and second sheets 12, 14 are sealed together, with at least one of the manifold openings 20, 22, 24, 26, 28 and 30 cut into and through the first and second sheets 12, 14.

At least one fluid channel 16 is created by kiss cutting through the first electrically conductive sheet 12 so that the channel 16 is in fluid communication with the at least one manifold openings 20, 26. In the example illustrated, there are three serpentine fluid channels 16 which fluidly connect the manifold openings 20, 26. As described above by reference to FIG. 2*b*, the step of kiss cutting involves completely cutting through the first electrically conductive sheet 12 and partially cutting into the second electrically conductive sheet 14.

The embossing step creates at least one mechanical bonding feature between the two sheets 12, 14. The kiss cutting step to create the fluid channels 16, the completely cutting through step to create the manifold openings 20, 22, 24, 26, 28 and 30 and the embossing step to create the embossing feature 34 can be carried out step wise or they can be carried out simultaneously. The embossing step creates a seal around the peripheral area of the first and second electrically conductive sheets 12, 14. Alternatively, the two sheets 12, 14 are sealed together using an adhesive.

The kiss cutting, embossing and cutting through steps use a respective flat, flexible dies using a manual, reciprocal hydraulic press. The press cutting force varies from 10,000 lbs to 60,000 lbs, which is monitored with a pressure gauge, and which depends on the number and spacing of die features. Thus, a tightly packed die with many features requires a greater cutting force. Once cut through and embossed, the plates 12, 14 are removed from the die with suboptimal feature definition, part deformation and jagged edges where the die cutter penetrated the flexible graphite material. Similarly, once cut through, the plates 12, 14 are also removed from the die with suboptimal feature definition, part deformation and jagged edges where the die cutter penetrated the flexible graphite material. The scrap material that is removed during the cutting can be recycled. The dies are designed and selected in such that they cut the specific flow openings and manifold openings in the plates, as well as emboss the peripheral areas 32, 72, 74.

In the method in which the steps of kiss cutting, cutting through and embossing are carried out simultaneously, the following steps are carried out:

i) locating the first electrically conductive sheet 12 onto the second electrically conductive sheet 14 so that they are in intimate contact with each other;

ii) kiss cutting through the first electrically conductive sheet 12 to create therein at least one channel for a fluid 16;

iii) cutting through the first and second electrically conductive sheets 12,14 to create therein at least one manifold opening 20, 22, 24, 26, 28 or 30 for a fluid; and iv) embossing the first and second electrically conductive sheets 12, 14 to create therein at least one mechanical bonding feature 34 between them.

Once the cutting and embossing steps are complete, the plates 12, 14 are finished by pressing them between two rigid, flat plates. The rigid, flat plates each include a non-stick coating such as for example Teflon™. Alternatively, the finishing can be carried out by pressing plates 12, 14 between two parallel rollers. The parallel rollers also include a non-stick coating like Teflon™.

The two flat, rigid, parallel plates are used in the same manual hydraulic press to improve feature tolerance, eliminate undesired deformation caused by the die, and to "flatten" rough, jagged edges left by the cutting process.

A thin layer of Teflon is the applied to the pressing fixture on either side of the plates to improve surface finish and to eliminate "sticking". The kiss cut, the cut through and the embossed plates are then ready for stack assembly in which a plurality of plates are stacked on top of each other.

As illustrated in FIG. 2b, the kiss cutting step is carried out using a die having at least one blade 15 or 17. The embossing step can be carried out using a die with at least one embossing feature. The number of blades and embossing features in the die can be varied according to the number of fluid channels 16 required and the type of sealing required. The die blades and embossing features can be at different heights so as to kiss cut, cut through or emboss accordingly.

The cut and embossed plate includes one or more oxidant flow openings; and one or more oxidant inlet manifold openings and one or more oxidant outlet manifold openings are located at the ends of the oxidant flow openings and in communication with them.

The cut and embossed plate can also include one or more fuel flow openings; and one or more fuel inlet manifold openings and one or more fuel outlet manifold openings which are located at the ends of the fuel flow openings.

The cut and embossed plate can also include one or more coolant flow openings; and at least one coolant inlet manifold opening and at least one coolant outlet manifold opening are located at the ends of the coolant flow openings and in communication with them.

The cut and embossed plate is an oxidant flow field plate, a fuel flow field plate, or a coolant flow field plate.

The plate includes two manifold openings fluidly connected to three channels, the three channels being disposed substantially parallel to each other and disposed in a serpentine configuration.

The cut and embossed plate is a separator plate.

The separator plate is a cooling fin separator plate.

High Volume Manufacturing Process

For higher volume manufacturing, rotary die cutting is used for increased throughput. Rotary flexible dies are available from many die manufacturers. Cylindrical flexible dies are mounted on a magnetic cylinder and mate with a cylindrical anvil, where each die can use the same magnetic cylinder to reduce cost. Rotary die cutting equipment for the label making industry is used. Automated reciprocal die cutting systems using flat dies with automatic material feed and part removal may also be considered.

Flexible graphite material (available in rolls) is automatically fed into the equipment. Typically, 3000 plates per hour are potentially possible using this manufacturing method.

The oxidant flow field plate, the fuel flow field plate and the coolant flow field plate are individually cut through and embossed using their respective rotary, flexible dies using rotary die cutting equipment. Similarly, the separator plates are individually cut through using their respective rotary, flexible dies using rotary die cutting equipment. The distance between the rotary die and anvil is adjusted to achieve optimal part cutting. An automated scrap removal system removes residual flexible graphite for recycling.

A plate handling system, which is typically a conveyor, groups and transports the cut through plates to the "finishing" area.

Each kiss cut, cut through and embossed plate is automatically fed into a rotary flattening system which comprises of two parallel rollers with Teflon coating and adjustable spacing. The finished plates are automatically removed from the rollers via conveyor and transported to their respective part bins. The plates are then ready for stack assembly.

Alternatives

A unitary body would be fabricated using the method as described above and be mechanically or adhesively bonded together by pressing force, or using silicone adhesive, respectively; this would create a bipolar plate. For the silicone adhesive case, a thin adhesive layer would be applied to the perimeter of the plates and not to the cell's active area section to maintain intimate contact between the flexible graphite plates, thereby reducing electrical contact resistance.

A "hybrid" laminate structure is also contemplated which may include flexible graphite fluid flow channels, a flexible graphite separator plate, and an additional very thin aluminum or stainless steel separator plate to reduce through plane reactant leakage. These subcomponents could also be mechanically or adhesively bonded together to create one part. In this case, the adhesive would again not be applied to the active area portion of the bipolar plate.

The "finishing" stage of the part fabrication could be used to increase the density of the flexible graphite and therefore improve mechanical and electrical properties (i.e. a 0.020" thick cut part could be pressed down to 0.015").

The plates can be fabricated with a high volume manufacturing process (reciprocal or rotary die-cutting commonly used in label making) therefore reducing overall part cost.

Parts can be fabricated using very low cost tooling (flat or cylindrical flexible dies). Moreover, flexible graphite raw material is inexpensive and is available in various forms and thicknesses.

Flexible graphite has a typical density of 1.12 g/cc. Pure graphite typically used for machining bipolar plates has a density of approximately 2.0 g/cc (1.79 times more). Graphite used for molded bipolar plates can achieve a density as low as 1.35 g/cc (1.2 times more) but requires expensive injection molding equipment and cavity dies. Additionally, flexible graphite bipolar plates fabricated via die-cutting have reduced mass because material is removed for flow channels and manifolds.

Fluid flow channel depth may be changed easily by changing the thickness of flexible graphite sheet and using same die. Also, a modular bipolar plate allows for various fuel cell configurations. For example, if more cooling is required for a specific application, a thicker cooling flow field plate can be substituted allowing higher cooling flows and heat removal.

Resulting bipolar plate is very thin (i.e. 0.015"+0.010"+0.010"+0.020"=0.055" thick) which reduces overall volume and weight.

The dies used can be a rule die, flexible die or solid engraved die. The die blade features to kiss cut, cut through and emboss can be at different heights so the features can be made simultaneously with one die.

OTHER EMBODIMENTS

From the foregoing description, it will be apparent to one of ordinary skill in the art that variations and modifications may be made to the embodiments described herein to adapt it to various usages and conditions.

What is claimed is:

1. A method for producing fluid flow field plates with complex flow field geometries, the method comprising:
   locating a first electrically conductive sheet on top of a second electrically conductive sheet so that they are in intimate contact with each other, the first and second electrically conductive sheets being sealed together, with at least one manifold opening cut through the first and second electrically conductive sheets; and
   creating at least one channel for a fluid by kiss cutting through the first electrically conductive sheet so that the at least one channel is in fluid communication with the at least one manifold opening.

2. The method, according to claim 1, further comprises:
   embossing the first and second electrically conductive sheets to create therein at least one mechanical bonding feature therebetween, the kiss cutting, the cutting through to produce the at least one manifold opening and the embossing steps being carried out simultaneously so as to create a cut and embossed plate.

3. The method, according to claim 1, in which the step of kiss cutting involves completely cutting through the first electrically conductive sheet and partially cutting into the second electrically conductive sheet.

4. The method, according to claim 1, in which the first and second electrically conductive sheets are sealed around a peripheral area.

5. The method, as claimed in claim 2, further comprises: finishing the cut and embossed first and second electrically conductive sheets by pressing them between two rigid, flat plates.

6. The method, according to claim 5, in which the rigid, flat plates each include a non-stick coating.

7. The method, as claimed in claim 2, further comprises: finishing the cut and embossed first and second electrically conductive sheets by pressing them between two parallel rollers.

8. The method, according to claim 7, in which the parallel rollers each include a non-stick coating.

9. The method, according to claim 1, in which the first and second electrically conductive sheet are sealed together using an adhesive.

10. The method, according to claim 1, in which the kiss cutting step is carried out using a die having at least one blade.

11. The method, according to claim 2, the embossing step is carried out using a die having at least one embossing feature.

12. The method, according to claim 2, in which the cut and embossed plate includes: i) one or more oxidant flow openings; and ii) one or more oxidant inlet manifold openings and one or more oxidant outlet manifold openings are located at the ends of the oxidant flow openings and in communication therewith.

13. The method, according to claim 2, in which the cut and embossed plate includes: i) one or more fuel flow openings; and ii) one or more fuel inlet manifold openings and one or more fuel outlet manifold openings which are located at the ends of the fuel flow openings.

14. The method, according to claim 2, in which the cut and embossed plate includes: i) one or more coolant flow openings; and ii) at least one coolant inlet manifold opening and at least one coolant outlet manifold opening are located at the ends of the coolant flow openings and in communication therewith.

15. The method, according to claim 2, in which the cut and embossed plate is an oxidant flow field plate, a fuel flow field plate, or a coolant flow field plate.

16. The method, according to claim 1, in which the fluid flow field plate includes two manifold openings fluidly connected to three channels, the three channels being disposed substantially parallel to each other and disposed in a serpentine configuration.

17. The method, according to claim 2, in which the cut and embossed plate is a separator plate.

18. The method, according to claim 17, in which the separator plate is a cooling fin separator plate having two cooling fins extending away from the separator plate.

19. The method, according to claim 1, in which the first and second electrically conductive sheets are flexible graphite.

20. A method for producing fluid flow field plates with complex flow field geometries, the method comprising:
   locating a first electrically conductive sheet onto a second electrically conductive sheet so that they are in intimate contact with each other;
   kiss cutting through the first electrically conductive sheet to create therein at least one channel for a fluid;
   cutting through the first and second electrically conductive sheets to create therein at least one manifold opening for a fluid; and
   embossing the first and second electrically conductive sheets to create therein at least one mechanical bonding feature therebetween, the kiss cutting through the first electrically conductive sheet, the cutting through the first and second electrically conductive sheets and the embossing steps being carried out simultaneously.

21. The method, according to claim 20, in which a plurality of electrically conductive sheets are stacked one on top of the other.

22. The method, according to claim 21, in which one or more of the electrically conductive sheets is a separator plate.

* * * * *